US008522005B2

(12) United States Patent
Mahmoud et al.

(10) Patent No.: US 8,522,005 B2
(45) Date of Patent: Aug. 27, 2013

(54) SYSTEM AND METHOD FOR MAPPING PLATFORM CONFIGURATION HUMAN INTERFACE INFRASTRUCTURE DATA TO SYSTEM ATTRIBUTES FOR LOCAL AND REMOTE SYSTEM MANAGEMENT (75) Inventors: Samer El Haj Mahmoud, Austin, TX (US); Austin Bolen, Austin, TX (US); Richard Chan, Austin, TX (US); William Munger, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 4 days.

(21) Appl. No.: 12/955,492

(22) Filed: Nov. 29, 2010

(65) Prior Publication Data
US 2012/0136888 A1 May 31, 2012

(51) Int. Cl.
*G06F 9/00* (2006.01)
*G06F 1/24* (2006.01)

(52) U.S. Cl.
USPC ........... 713/100; 707/708; 707/769; 707/812; 707/966; 713/2; 713/183

(58) Field of Classification Search
USPC ............ 707/999.001–999.206, 708, 769, 707/812, 966, 2, 100, 183
See application file for complete search history.

(56) References Cited

U.S. PATENT DOCUMENTS

| | | | |
|---|---|---|---|
| 7,246,224 B2 * | 7/2007 | Rothman et al. | 713/1 |
| 7,263,605 B2 * | 8/2007 | Rothman et al. | 713/2 |
| 7,421,431 B2 * | 9/2008 | Zimmer et al. | 1/1 |
| 7,500,095 B2 | 3/2009 | Mahmoud et al. | |
| 7,539,854 B2 * | 5/2009 | Rothman et al. | 713/1 |
| 7,593,956 B1 * | 9/2009 | Yakovlev | 1/1 |
| 7,711,758 B1 * | 5/2010 | Gillespie | 707/812 |
| 7,991,785 B1 * | 8/2011 | Yakovlev | 707/769 |
| 2004/0252122 A1 * | 12/2004 | Rothman et al. | 345/467 |
| 2008/0209193 A1 * | 8/2008 | Zhang et al. | 713/1 |
| 2009/0132799 A1 | 5/2009 | Brumley et al. | |
| 2009/0210689 A1 | 8/2009 | Harmer | |

OTHER PUBLICATIONS

"Unified Extensible Firmware Interface Specification, Version 2.1," UEFI, Errata and amplifications through Oct. 1, 2008, pp. 1173-1176.
"Unified Extensible Firmware Interface Specification, Version 2.3," UEFI, Errata B, Feb. 25, 2010, pp. 1476-1480.
U.S. Appl. No. 12/698,297, filed Feb. 2, 2010.
U.S. Appl. No. 12/534,704, filed Aug. 3, 2009.

* cited by examiner

*Primary Examiner* — Jung Kim
*Assistant Examiner* — James J Wilcox
(74) *Attorney, Agent, or Firm* — Larson Newman, LLP (57) ABSTRACT

A first portion of a Unified Extensible Firmware Interface (UEFI) configuration language string is determined, the first portion identifying an Human Interface Infrastructure (HII) configuration attribute. A second portion of the string is determined and includes a first attribute modifier. The first attribute modifier includes a first name-value pair identifying a first name and a first value. The first name and the first value are individually parsable, and the meaning of the first value is determined based on the first name. The string is stored at a HII string package of an HII database. An HII string identifier uniquely references the string.

20 Claims, 8 Drawing Sheets

| NAME | VALUE |
|---|---|
| FQDD | Fully qualified device descriptor |
| BootPath | Path to UEFI boot file on a device |
| BootData | Unicode representation of hexadecimal data to be passed to OS loader |
| BootType | Boot method |
| Partition | Logical partition number |
| Port | Physical port number |
| Dependency Action Keyword | Parent Prompt=Value |

| Dependency Type | Required IFR Expression | Required Modifier |
|---|---|---|
| Read-Only Question | EFI_IFR_GRAY_OUT_IF_OP | ReadOnlyIf or ReadOnlyIfNot |
| Show/Hide Option | EFI_IFR_SUPPRESS_IF_OP | SuppressIf or SuppressIfNot |
| Forced Value Option | EFI_IFR_SUPPRESS_IF_OP | SuppressIf or SuppressIfNot (for all but valid value) ForceIf or ForceIfNot (for child question) |

502 — Read-Only Question
504 — Show/Hide Option
506 — Forced Value Option

SYSTEM AND METHOD FOR MAPPING PLATFORM CONFIGURATION HUMAN INTERFACE INFRASTRUCTURE DATA TO SYSTEM ATTRIBUTES FOR LOCAL AND REMOTE SYSTEM MANAGEMENT

RELATED APPLICATIONS

This application is related to U.S. patent application Ser. No. 12/955,493, entitled "System and Method for Expressing Platform Configuration Dependencies for Local and Remote System Management," by Austin Bolen et al., filed of even date herewith, which is hereby incorporated by reference.

FIELD OF THE DISCLOSURE

This disclosure generally relates to information handling systems, and more particularly relates to a system and a method for managing configuration of information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Initialization, operation, and administration of information handling systems have historically been managed using proprietary software and devices. For example, when an information handling system is turned on, a processor device may execute program instructions associated with a basic input/output system (BIOS). These instructions may incrementally activate hardware and software subsystems that collectively make up the information handling system, and ultimately pass control of the information handling system to an operating system (OS). These subsystems may include internal communication channels, network interface controllers, memory devices, and the like. Subsystems may incorporate embedded firmware that can be executed to facilitate initialization of the respective subsystem. The combination of proprietary and ad-hoc subsystem architectures and protocols can make configuration and administration of the information handling system difficult. For example, administration procedures associated with a particular information handling system may vary based on the model, the manufacturer, and the individual configuration of the system.

Manufacturers and industry consortiums promulgate system architectures and protocol specifications to standardize the operation and interaction of system devices. For example, the Unified Extensible Firmware Interface (UEFI) specification defines a collection of procedures and protocols in an attempt to standardize the interface and interoperability of devices that together make up an information handling system. These specifications can be revised periodically.

BRIEF DESCRIPTION OF THE DRAWINGS

Embodiments incorporating teachings of the present disclosure are shown and described with respect to the drawings presented herein, in which.

The use of the same reference symbols in different drawings indicates similar or identical items.

DETAILED DESCRIPTION

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
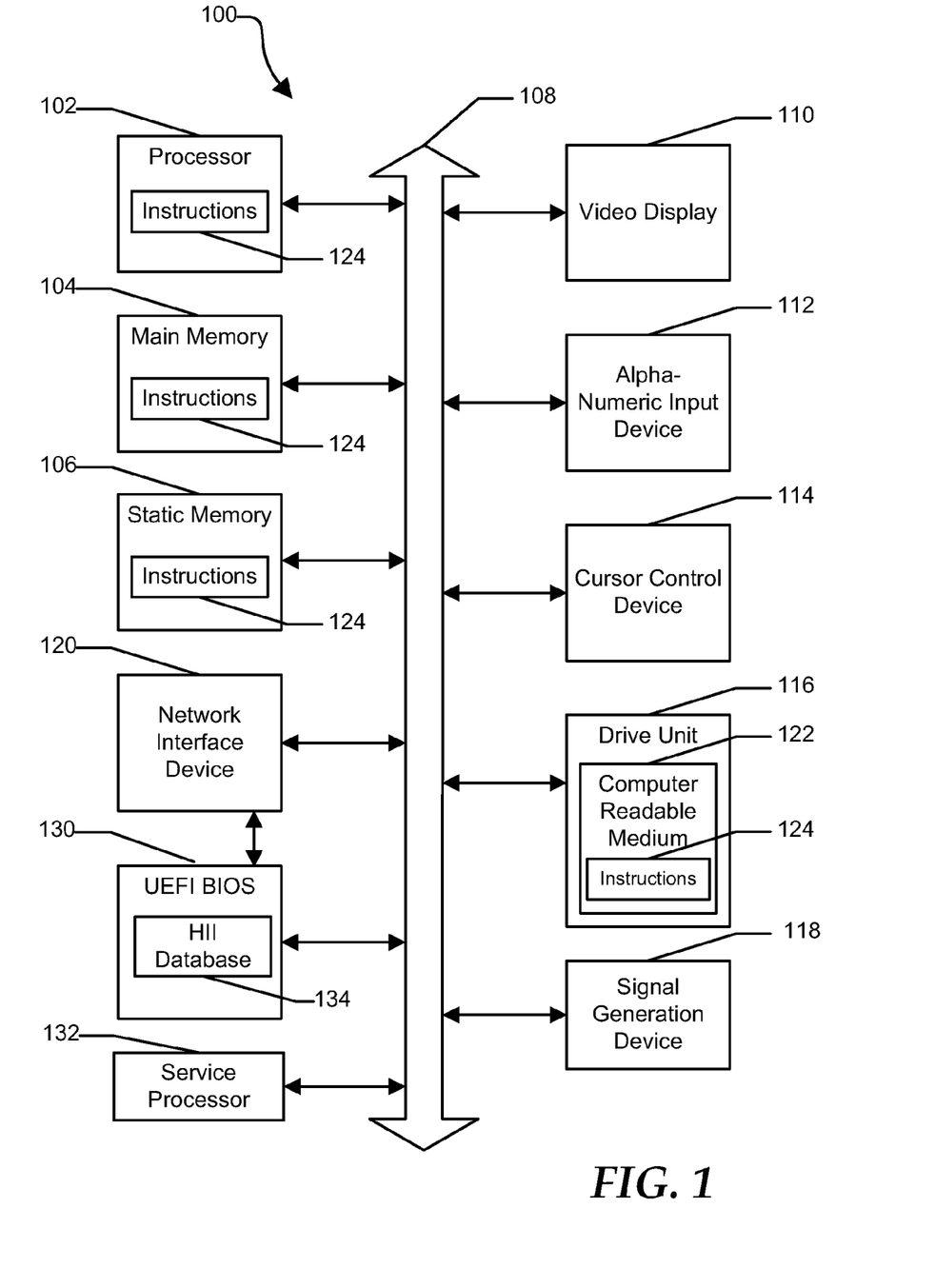
FIG. 1 is a block diagram illustrating an information handling system including a UEFI compliant basic input/output system (BIOS) in accordance with a specific embodiment of the present disclosure.

FIG. 1 shows an information handling system 100 including a Unified Extensible Firmware Interface (UEFI) compliant basic input/output system (BIOS) 130 in accordance with a specific embodiment of the present disclosure. The information handling system 100 may include a processor 102 such as a central processing unit (CPU), a graphics processing unit (GPU), or both. Moreover, the information handling system 100 can include a main memory 104 and a static memory 106 that can communicate with each other via a bus 108. As shown, the information handling system 100 may further include a video display unit 110, such as a liquid crystal display (LCD), an organic light emitting diode (OLED), a flat panel display, a solid state display, or a cathode ray tube (CRT). Additionally, the information handling system 100 may include an input device 112, such as a keyboard, and a cursor control device 114, such as a mouse. The information handling system 100 can also include a disk drive unit 116, a signal generation device 118, such as a speaker or remote control, and a network interface device 120. The UEFI BIOS 130 may include an HII database 134. The HII database 134 is used to store information describing the configuration of devices included at the information handling system 100, and to provide an interface through which the configuration of components at the system can be manipulated. The information handling system 100 can include a service processor 132 to enable remote monitoring and management of the information handling system 100.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The information handling system 100, and the UEFI BIOS 130 in particular, is preferably substantially compliant with one or more revisions of the UEFI specification. Furthermore, the UEFI BIOS 130 includes enhancements to extend the existing capabilities of the UEFI specification in order to overcome particular operational deficiencies present in the existing UEFI specification. In an embodiment, a method and a corresponding syntax is disclosed to facilitate the association of additional information with selected system attributes. In particular, additional information in the form of attribute modifiers can be associated with HII UEFI configuration language strings stored at an HII database, such as the HII database 134. The additional information can be used to uniquely identify and differentiate configurable system attributes provided at the information handling system. In a conventional information handling system, device drivers associated with subsystem components may not disclose respective configuration information to other software application programs. For example, a UEFI compliant driver associated with a disk drive device may refer to the device using an HII configuration attribute that is known only to the driver, or that is unique to a particular platform configuration. As disclosed herein, an attribute modifier can be associated with the HII configuration attribute, wherein the attribute modifier can provide a platform-independent identifier that can be used to refer to the device. Consequently, application software, such as system configuration software, can manage the configuration of the device using the platform-independent identifier.

An attribute modifier also can be used to identify when a value or a relevance of one configuration parameter depends on a value of another configuration parameter. For example, configuration settings associated with the disk drive device in the previous example may specify whether the disk drive device is enabled or disabled. If the disk drive is disabled, the device driver associated with the disk drive typically removes or grays-out presentation of other configuration settings associated with the device, such as a power-saving option. However, the device driver associated with the disk drive may not publish this dependency information in a manner that is accessible to other application programs. Accordingly, attribute modifiers can be incorporated with existing configuration data to permit other applications to identify interdependencies between configuration settings associated with a device or an object.

As disclosed herein, attribute modifiers can be associated with devices or other configurable objects at an information handling system to permit an application program, such as a system configuration program, to identify and manage configuration options associated with the devices. While attribute modifiers are described herein in the context of HII strings associated with a UEFI compliant driver, one skilled in the art will appreciate that, the disclosed techniques can be applied to other configuration infrastructures. For example, attribute modifiers can be associated with configuration information and system attributes represented using the Extensible Markup Language (XML), or using another language or database management system. For clarity, the disclosed techniques are described below in the context of UEFI/HII configuration language strings.

Techniques disclosed herein can be used by application software to administer and configure information handling systems both locally and remotely, and can facilitate the administration of diverse systems in a platform-independent manner. An application program can use the techniques disclosed herein to discover devices and associated configurable attributes in a systematic manner without prior knowledge of specific subsystems included at the information handling system. For example, a platform configuration application, such as a remote platform configuration application, can extract configuration information from an information handling system using UEFI protocols, determine a relationship between the configuration options and the various devices included at the system, and manipulate the configuration information while the information handling system is offline or in a powered-down state. However, while the information handling system is offline, software callbacks and HII protocols to access configuration information at the system are unavailable. Accordingly, attribute modifiers associated with the configuration options can identify other configuration settings on which the options depend. Knowledge of the interrelationship between configuration parameters may otherwise be unavailable to a remote configuration application.

Figure 2:
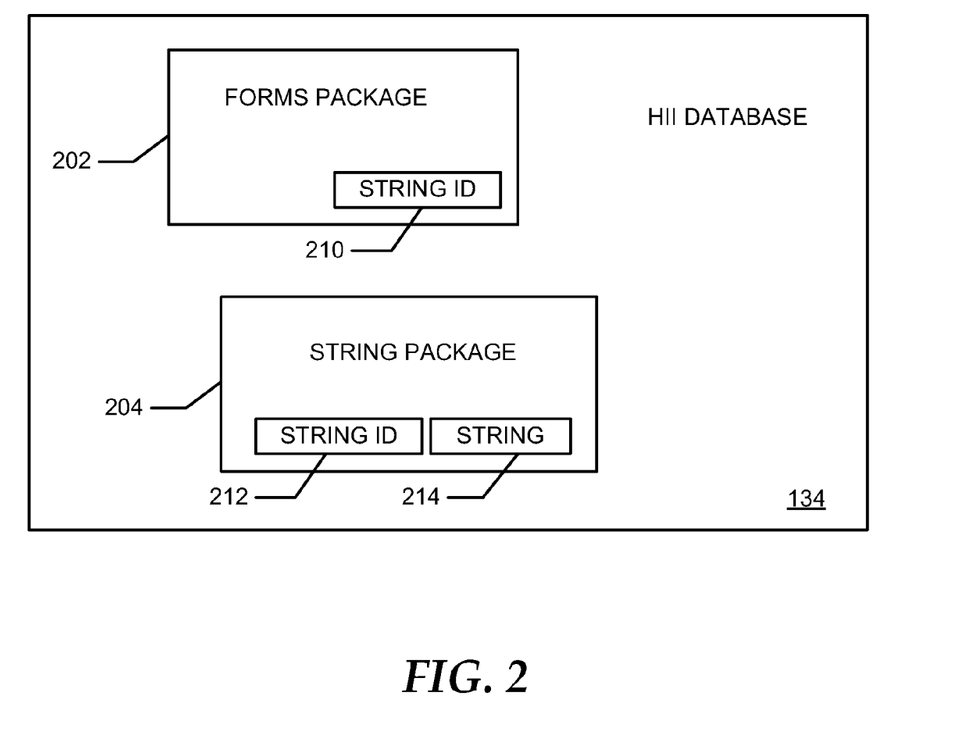
FIG. 2 is a block diagram of a Human Interface Infrastructure (HII) database of FIG. 1 in accordance with a specific embodiment of the present disclosure.

FIG. 2 shows the HII database 134 of FIG. 1. The HII database 134 can be used to store configuration information associated with UEFI compliant devices and device drivers included at an information handling system, such as the information handling system 100. Furthermore, attribute modifiers disclosed herein can be coupled to selected configuration information to expose details of a system's operation that may be needed by application programs, including system configuration and management software. The UEFI specification provides a standardized way in which firmware can communicate with a user or application software concerning firmware related settings. Version 2.1 of the UEFI specification introduced the HII, which is designed to give the platform firmware centralized control over how input, output, and system configuration are managed. The HII also includes information such as fonts, bitmaps, forms, and protocols for routing of configuration information between subsystems of the information handling system. The HII also supports presentation of the configurable information in any desired language, such as English and French, by associating objects and object attributes with a string identifier, which is a number that can be mapped to a corresponding string of a particular language. The HII database 134 includes a forms package 202 and a string package 204. The forms package 202 includes a representative string ID 210, and the string package 204 includes a representative string ID 210 and a corresponding string 212. The HII database 134 may include other packages (not shown), such as a font package.

Forms provide a dialog interface through which a user or an application program can query or manipulate the configuration of one or more devices at an information handling system. Each opportunity to modify a configurable attribute of a respective device is referred to as a question. A form can present a question along with a set of options enumerated by the question. An individual system device can be associated with more than one question. The forms are stored in an HII database, such as the HII database 134, along with strings, fonts, and images. The various objects and attributes of the forms are encoded using an Internal Forms Representation (IFR), each object included therein consisting of a byte stream. A forms browser provides a forms-based user interface, which understands how to read the contents of the forms, interact with the user, and save the resulting configuration values. Other applications, such as a form-processor, may use the information within the forms to query configuration setting values without providing a user interface. Forms data can be installed by an application or by a device driver during initialization of the HII database. The forms browser organizes the forms so that a user may navigate between forms, select the individual questions, and change the values using human interface devices at the information handling system, such as the video display 110, the keyboard 112, and the mouse 114 at the information handling system 100.

The HII specification provides application programming interfaces (APIs) to allow drivers, including those on plug-in cards, to have full access to HII resources, including forms, strings, and fonts, and be able to contribute additional resources. The HII database 134 typically does not represent a single memory storage device, but instead includes a data structure for identifying one or more memory devices that comprise the HII database 134. For example, a UEFI compliant hardware device can include an internal memory device, such as a non-volatile random access memory (NVRAM), for storing device driver attributes including information represented in the HII database 134.

The HII database 134 acts as a repository for configuration and user-interface resources, including forms, fonts, strings, images, animations, and keyboard layouts. The platform and individual drivers can install, modify, and remove these resources. The UEFI BIOS 130 provides a uniform environment for users and applications to access configuration information, and is responsible for administering the sequence of steps necessary to initialize (boot) the information handling system 100. The HII includes a HII forms browser, which provides a user-interface where forms can be displayed and input from the user is acquired in order to update configuration settings. Forms information is stored in a forms package, such as the forms package 202. A forms package can include multiple form sets, and each form set can include multiple forms. For example, access to all configuration information associated with the network controller 120 can be administered by a collection of forms included in a shared forms package.

Alpha-numeric text displayed within a form is included at one or more corresponding string packages. Each string package includes text in one language, and multiple languages can be supported at an information handling system by providing string packages corresponding to each of the desired languages. The information handling system 100 can be configured to support a language other than English, such as Spanish, by simply directing the UEFI to access string information from a string package associated with the desired language. In this way, configuration data administered via the forms packages can be maintained in a language-independent manner, while the configuration data and user-interface can be presented to a user in their native language. Objects referenced within a form package are assigned a unique string identifier. This string identifier can be used to retrieve a string associated with the referenced object from a corresponding strings package. For example, a string 212 associated with a system attribute referenced at the forms package 202 using the string ID 210 can be retrieved from the string package 204 using the string ID 210.

A UEFI driver or application may provide a forms-based interface to present individual configuration settings available at an information handling system. Each configuration setting can be associated with an HII question. An HII question is a type of HII statement that has a value, and the value corresponds to a configuration setting for the information handling system. A form, included at a forms package, may present one or more questions and an interface though which a user or an application program can select between a set of provided configuration options. For example, an HII question may represent an option to enable or disable a Universal Serial Bus (USB) port. Form data associated with an HII question includes a pointer to where the associated configuration data is stored, an Op-code to identify a type of HII question, and other information pertinent to each type of question. For example, the HII question Op-code "EFI_IFR_ORDERED_LIST_OP" can be used to specify a boot-order of a set of bootable devices.

Each HII question has an associated identifier known as a Question Prompt Token. This identifier is a string ID that can be used to retrieve a corresponding string (question prompt string) from any of a set of a set of available string packages associated with the forms package. A question may include one or more options representing a selection of values associated with the question. Like other objects referenced by a form, each option is associated with a string (question option string) stored at a string package and referenced by a unique string ID. Thus, a form can refer to questions, configuration settings, values, etc. in a language-independent manner by instead referencing these objects within a form using a respective string ID.

In addition to string packages associated with human-readable languages, version 2.1 of the UEFI specification introduced the concept of a UEFI configuration language (x-UEFI) and associated configuration language string packages. A UEFI configuration language string package is similar to a human-readable language string package. Thus, a string ID included in a forms package can be used to retrieve a corresponding string from any of available language packages, including the UEFI configuration language string package. Unlike the human-language string packages, configuration language strings typically are not displayed within a user-manipulated configuration form. Instead, application programs, such as configuration programs, can retrieve strings stored at a UEFI configuration language string package. The UEFI configuration language can be used to map HII Questions to pre-defined keywords, such as an HII configuration attribute. One example of such keywords is the Distributed Management Task Force (DMTF) Attributes defined in the DMTF Common Information Model (CIM) BIOS Management Profile. HII configuration attributes can include industry-standard BIOS attributes, such as those defined in the DMTF BIOS Attributes Registry, or they can be specific to a particular information handling system vendor. An HII configuration attribute can include an alphanumeric string that identifies a device or other object whose configuration can be altered, a configuration option at a device, an HII question prompt identifier, an option associated with an HII question, and the like. As used herein, the terms HII configuration attribute, BIOS attribute, and system attribute are used synonymously.

HII questions are uniquely identified within an HII form set using a respective sixteen-bit Question Identifier. The Question Identifier, along with a UEFI Device Path, and a Form Set Identifier (typically a globally unique identifier (GUID)), uniquely identifies a configuration setting within the information handling system. This set of identifiers is suitable for use by the UEFI BIOS to administer device configuration options. Unfortunately, the identifiers are not sufficient to permit system management software to identify or correlate all available system attributes with corresponding configuration options. This is because Question Identifiers are arbitrary numbers that are specific to a particular UEFI driver implementation. GUID and device path values are platform and device specific and may vary from one system implementation to another. Furthermore, standard HII configuration attribute values available within a UEFI configuration language string package may be insufficient to provide a comprehensive mapping to all configuration variables associated with a device or object.

Techniques disclosed herein can be used to uniquely map HII configuration data to respective configuration objects, and to provide additional information to application software that is not available in a conventional UEFI compliant information handling system. This is accomplished by appending one or more attribute modifiers to selected HII configuration attribute strings stored at a UEFI configuration language string package. Each attribute modifier includes a string having a syntax consisting of a name-value pair. The name-value pair can provide supplemental information that an application can use to correlate a configuration option with a respective object at the information handling system. An HII configuration attribute and a respective attribute modifier can together represent a hardware device, a question prompt string, an option string associated with a question, or another type of component or attribute. An HII configuration attribute, optionally associated with an attribute modifier and included at a UEFI configuration language string package, is referred to herein as a configuration language mapping string.

For example, a configuration language mapping string having an HII configuration attribute and two attribute modifiers has the following format:

AttributeName[ModifierName:ModifierValue][ModifierName:ModifierValue]

Each attribute modifier is included within a pair of square brackets, and each includes a name, "ModifierName," and a value, "ModifierValue," separated by a colon. The attribute modifiers are appended to an HII configuration attribute "AttributeName." While this syntax convention permits efficient and unambiguous parsing of the configuration language mapping strings by an application program, one skilled in the art will appreciate that an attribute modifier can use another syntax that supports parsing. While the use of attribute modifiers is illustrated in the context of HII strings, one skilled in the art will appreciate that the concept of attribute modifiers disclosed herein can be associated with other system configuration management architectures and data structures.

Figure 3:
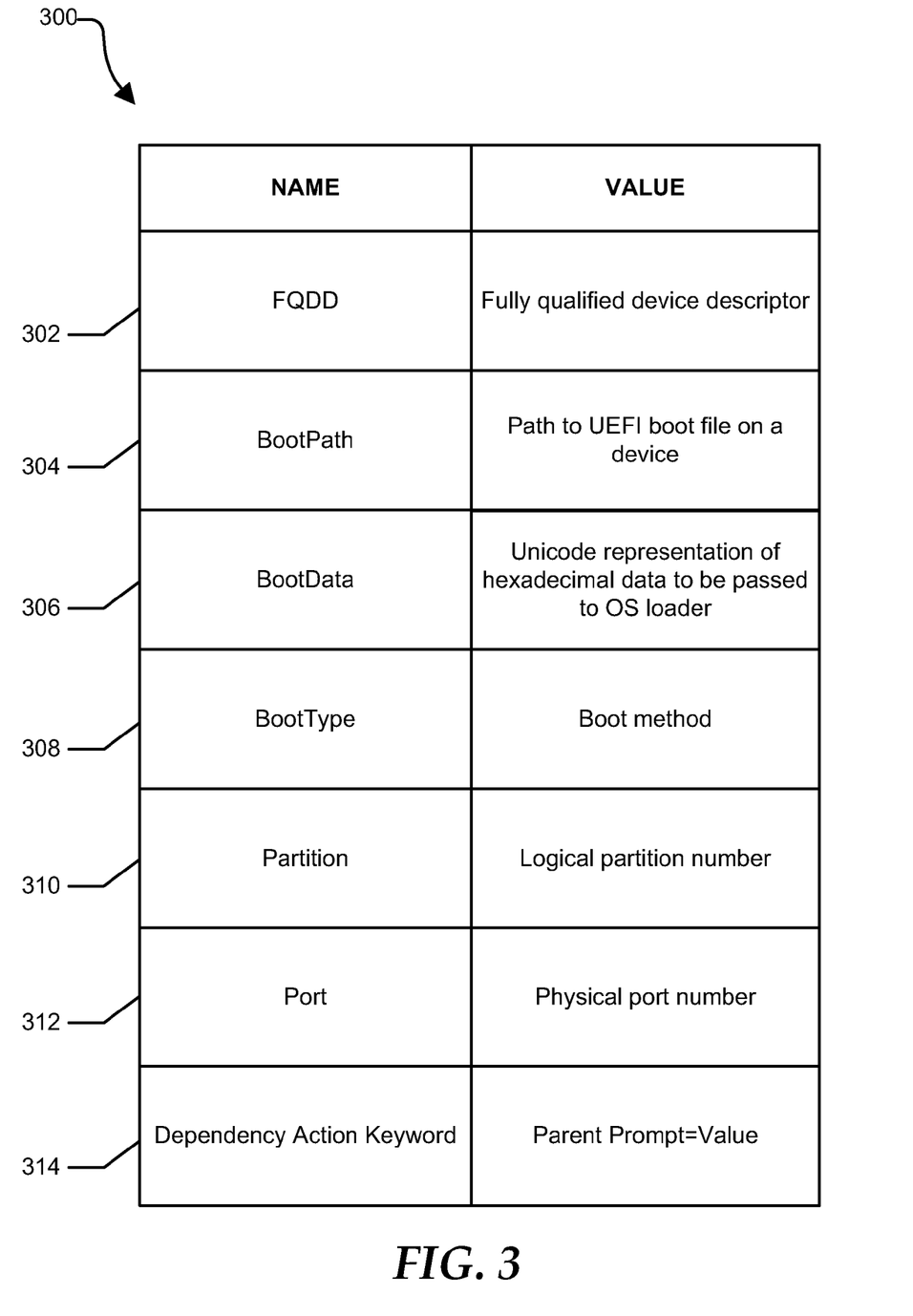
FIG. 3 is a table illustrating examples of attribute modifiers that may be included at a string package of the HII database of FIG. 2 in accordance with a specific embodiment of the present disclosure.

FIG. 3 shows a table 300 illustrating examples of attribute modifiers that may be included at the string package 204 of the HII database 134 of FIG. 2. The attribute modifiers can be accessed by an application program, such as a system configuration application, and can be used to identify an interrelationship between configuration information and devices included at an information handling system. The table 300 includes rows corresponding to attribute modifiers 302, 304, 306, 308, 310, 312, and 314, respectively. Each attribute modifier includes a name and a value that together provide a name-value pair. Attribute modifiers 302-314 are but a few examples of any number of attribute modifiers, and are selected to demonstrate the variety of purposes to which attribute modifiers can be enlisted.

Attribute modifier 302 has a name FQDD and a value that provides a fully qualified device descriptor. A FQDD attribute modifier can be appended to an HII configuration attribute string to provide a UEFI configuration language mapping string that identifies the fully qualified device descriptor of the associated HII configuration attribute. A UEFI configuration mapping string can include more than one attribute modifier, and each modifier is included with a respective pair of square brackets. An application program can parse the UEFI string to identify the HII configuration attribute, the name of an associated modifier, the value of the modifier, or any combination thereof. For example, the HII configuration attribute string "HDD1" may correspond to a disk drive device within an information handling system. The HII configuration attribute string HDD1 may be sufficient to allow a corresponding UEFI compliant driver, provided by the disk drive device, to administer local management and configuration of the device. However, the HII configuration attribute string may be insufficient to allow similar configuration by a platform independent application program. For example, an information handling system may include multiple disk drive devices, and an application program may identify each disk drive device using a fully qualified device descriptor. The application program can use the complete UEFI configuration mapping string to uniquely map configuration information to each of the disk drive devices.

The following UEFI configuration language mapping string includes a FQDD attribute modifier:

EnDis1[FQDD:Hdd.Embedded.0]

"EnDis1" is an HII configuration attribute associated with an HII question prompt or a question option string. For example, EnDis1 may be a configuration setting to enable/disable a disk drive device. The attribute modifier, "FQDD:Hdd.Embedded.0" identifies the fully qualified device descriptor, "Hdd.Embedded.0" of the disk drive device corresponding to the configuration question.

Attribute modifier 304 has a name BootPath and a value that identifies a UEFI boot file. The boot file specifies the file path from a UEFI boot variable. The following UEFI configuration language mapping string includes a BootPath attribute modifier:

HDD1[BootPath:\bootfiles\os1\ efi]

"HDD1" is an HII configuration attribute associated with an HII question prompt string or an option prompt string. A BootPath attribute modifier is appended to the HII configuration attribute to identify a file path specification (bootfiles\os1\efi) corresponding to a boot file.

Attribute modifier 306 has a name BootData and a value that identifies a Unicode representation of hexadecimal data to be passed to an operating system (OS) loader. The following UEFI configuration language mapping string includes a BootData attribute modifier:

HDD1[BootPath:\bootfiles\os1\efi]     [BootData:SafeMode]

"HDD1" is an HII configuration attribute associated with an HII question prompt string or an option prompt string. The BootPath attribute modifier is used to identify the file path of a boot file and the BootData attribute modifier is used to identify a parameter, "SafeMode," that is to be passed to the boot file. For example, it may be possible to configure an OS to boot in either Safe Mode, or in Debug mode. The BootData attribute modifier can be used to designate a particular mode in which the OS should boot.

Attribute modifier 308 has a name BootType and a value that identifies a boot method for a device with different boot capabilities. For example, a network interface device may support booting in either a "iScsi," or a "Pxe" mode. The following UEFI configuration language mapping string includes a BootType attribute modifier:

Nic1[BootType:iScsi][FQDD:NIC.Embedded.1]

"NIC1" is an HII configuration attribute associated with an HII question prompt string or an option prompt string. The BootType attribute modifier is used to specify that the device identified by the string NIC1 be configured to boot using an iScsi method. The present example includes an FQDD attribute modifier to identify, explicitly, the device associated with the HII configuration attribute "Nic1."

Attribute modifier 310 has a name Partition and a value that identifies a logical partition number associated with the HII configuration attribute. For example, a single port may support multiple logical networks. The following UEFI configuration language mapping string includes a Partition attribute modifier:

Nic1[FQDD:NIC.Slot.4][Partition:1]

"Nic1" is an HII configuration attribute associated with an HII question prompt string or an option prompt string. A FQDD attribute modifier specifies a fully qualified device descriptor associated with the device Nic1, "Nic1.Slot.4" that identifies a specific network interface device located at slot 4. A Partition attribute modifier associates Nic1 with a first logical network at the device.

Attribute modifier 312 has a name Port and a value that identifies a physical port number associated with the HII configuration attribute. For example, a port typically includes a designated port number. The following UEFI configuration language mapping string includes a Port attribute modifier:

Nic1[FQDD:NIC.Slot.4][Port:2][Partition:1]

"Nic1" is an HII configuration attribute associated with an HII question prompt string or an option prompt string. The present example illustrates the association of three attribute modifiers with the HII configuration attribute. A FQDD attribute modifier specifies a fully qualified device descriptor associated with the device Nic1, the FQDD having a value "Nic1.Slot.4" that identifies a network interface device installed at slot 4. A Port attribute modifier associates Nic1 with a second port. A Partition attribute modifier associates Nic1 with a first logical network at this device.

Attribute modifier 314 illustrates a dependency attribute modifier (or simply dependency modifier). A dependency modifier can be used to express a dependency between two HII configuration attributes, and will be described in detail below. The dependency modifier 314 includes a name selected from a set of dependency action keywords, including ReadOnlyIf, ReadOnlyIfNot, SuppressIf, SuppressIfNot, ForceIf, and ForceIfNot. The value of a dependency modifier can be an expression of the form "AttributeName=AttributeValue," where AttributeName is a UEFI configuration language HII configuration attribute, and AttributeValue is another configuration language HII configuration attribute.

The following UEFI configuration language mapping string includes a Dependency attribute modifier:

NicBootMode[ReadOnlyIf:NicEnable=Disabled]

"NicBootMode" is an HII configuration attribute associated with an HII question prompt string. The dependency action keyword "ReadOnlyIf" specifies that the referenced question or option should be presented at a form browser or form application programming interface (API) as un-alterable (grayed-out or otherwise configured to be read-only) based on a logical resolution of the statement "NicEnable=Disabled." For example, a configuration form associated with the boot mode of a NIC corresponding to the HII configuration attribute NicBootMode (child) should be set to read-only if another HII configuration attribute NicEnable (parent) has been configured to be disabled. In other words, the child question (to determine the boot mode of the NIC) is no longer relevant since the NIC has been disabled via the parent question. The statement can include Boolean operators such as "OR," "AND," or another operation, to control an action based on the value of two or more parent questions or options.

A ReadOnlyIf dependency action keyword can be used to determine whether a configuration setting can be modified. The ReadOnlyIf dependency modifier can be associated with a question prompt, and the associated object can be rendered read-only based on whether the logical resolution of the statement that makes up the value of the dependency modifier is true. A ReadOnlyIfNot dependency action keyword determines whether a configuration form question prompt is configured to be read-only based on whether the logical resolution of the statement is false. The "Not" form of each dependency action keyword is useful to reduce the number of modifiers that are needed when more than two option conditions exist, and a single dependency modifier can be associated with one of the options, rather than with each and all of the remaining options. A SuppressIf dependency modifier can be used to hide (make invisible) a configuration form question prompt or question option. The ForceIf dependency action keyword is associated with a question option, and can be used to select this option when the corresponding statement is true. As will be described in detail later, dependency attributes can be associated with question prompt strings as well as with question option strings. A dependency modifier generally is associated with a child question, which depends on the particular configuration established by a parent question, but a dependency modifier can also be associated with a parent question if that parent question is also itself a child of another question.

All attribute modifiers can be associated with a question prompt string, a question option string, another type of HII configuration attribute, or any other type of string or representation of an object associated with an information handling system. An attribute modifier can be associated with an object represented in a UEFI HII string package, or it can be associated with an object represented in another type of data structure.

Figure 4:
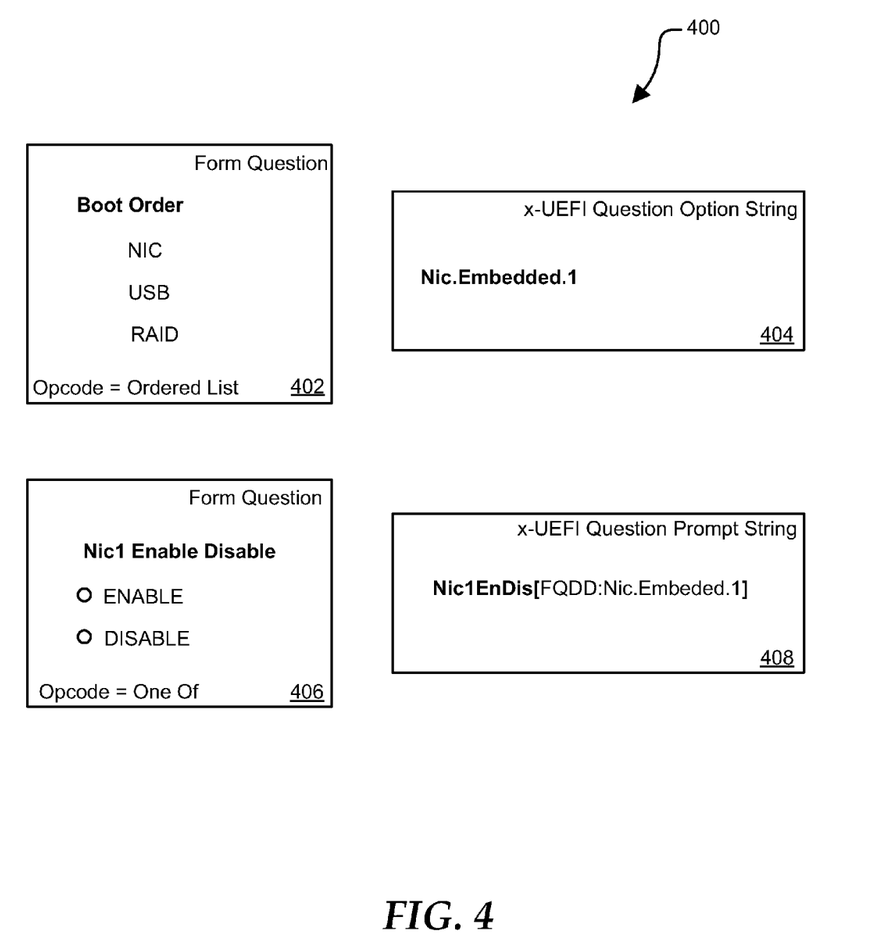
FIG. 4 is a block diagram illustrating examples of configuration information that can be stored at the HII database of FIG. 1 in accordance with a specific embodiment of the present disclosure.

FIG. 4 shows examples of configuration information 400 that can be stored at the HII database of FIG. 1. Configuration information 400 illustrates two configuration questions that each relate to a single device at an information handling system. An attribute modifier is associated with one configuration question, which uniquely identifies the device to which the configuration question is directed. The configuration information 400 includes a UEFI HII forms question 402, a corresponding question prompt string 404, another forms question 406, and another question prompt string 408. The forms questions 402 and 406 can be included in an HII forms package, such as the HII forms package 202 at FIG. 2, and the strings 404 and 408 can be included in an HII strings package, such as the HII strings package 204 of FIG. 2. Each package can be included in an HII package list.

The forms question 402 includes a UEFI HII forms (IFR) opcode "EFI_IFR_ORDERED_LIST_OP," which is used to specify an ordered list of objects. In particular, the forms question 402 provides a dialog for configuring the boot-order of three bootable devices, "NIC1," "USB," and "RAID." For example, a user of an information handling system can use a UEFI HII forms browser to identify a device that the information handling system should first attempt to boot from, followed by a second choice in the event that the first choice was unsuccessful, and finally a third choice. Each object identified in a forms package is referenced by a respective string ID. Thus, the text strings illustrated at the forms question 402 are actually located within one or more strings package, and the form includes only string IDs corresponding to each object. For example, the forms browser may display strings extracted from an English language string package. Each string ID referenced at the forms question 402 also can be included at a UEFI configuration language string package. The question option string 404 is an example of a UEFI configuration language question option string, which includes an HII configuration attribute "Nic.Embedded.1," which shares a string ID value with the English language string "NIC." Accordingly, the string "NIC" and the string "Nic.Embedded.1" refer to the same object. The UEFI string package can include a question prompt string associated with the English language string "Boot Order," as well as options strings associated with the remaining options. The question option string 404 does not include an attribute modifier.

The forms question 406 includes a UEFI HII forms (IFR) opcode "EFI_IFR_ONE_OF_OP," which is used to select one object from a set of objects. In particular, the forms question 406 provides a dialog for configuring whether the NIC referenced at the forms question 402 is enabled or disabled. Once again, the text illustrated at the forms question 406 may be contained in an English language string package. The string data 408 represents a UEFI configuration language prompt string corresponding to the forms question 406, and shares a string ID value with the English string "Nic1 Enable Disable." The string data 408 includes an attribute modifier. For example, the question prompt string 408, "Nic1EnDis [FQDD:Nic1.Embedded.1]," includes a first portion that represents an HII configuration attribute Nic1EnDis, which corresponds to the English string "Nic1 Enable Disable." The question prompt string 408 includes an attribute modifier "FQDD:Nic1.Embedded.1," that in turn includes an attribute modifier name "FQDD," and an attribute modifier value "Nic1.Embedded.1." Accordingly, the fully qualified device descriptor for the device that is the target of the question Nic1EnDis, is Nic1.Embedded.1. String data 408 can include additional attribute modifiers, such as a dependency modifier.

The attribute modifier at the question prompt string 408 is configured to associate the configuration question represented by the forms question 406, with the particular object (device), referenced by an option at the forms question 402. In particular, the attribute modifier provides a fully qualified descriptor, "Nic.Embedded.1," that is the device associated with the forms question 406. Application software is thus able to correlate the forms question 402 and the forms question 406 with a single device. Without the attribute modifier, the application software may have no way to determine that the NIC device included additional configuration options, without a priori knowledge of the platform architecture and devices. Accordingly, attribute modifiers can be associated with HII configuration attributes, such as devices, drivers, configuration prompt questions and options, and the like, to enable application software, such as remote configuration software, to manage the configuration of an information handling system in a platform-independent manner. In other words, the application software can interface, interrogate, and administer information handling systems of disparate versions and hardware configurations, and even from different manufacturers, without prior knowledge about the specific makeup of the systems.

Figure 5:
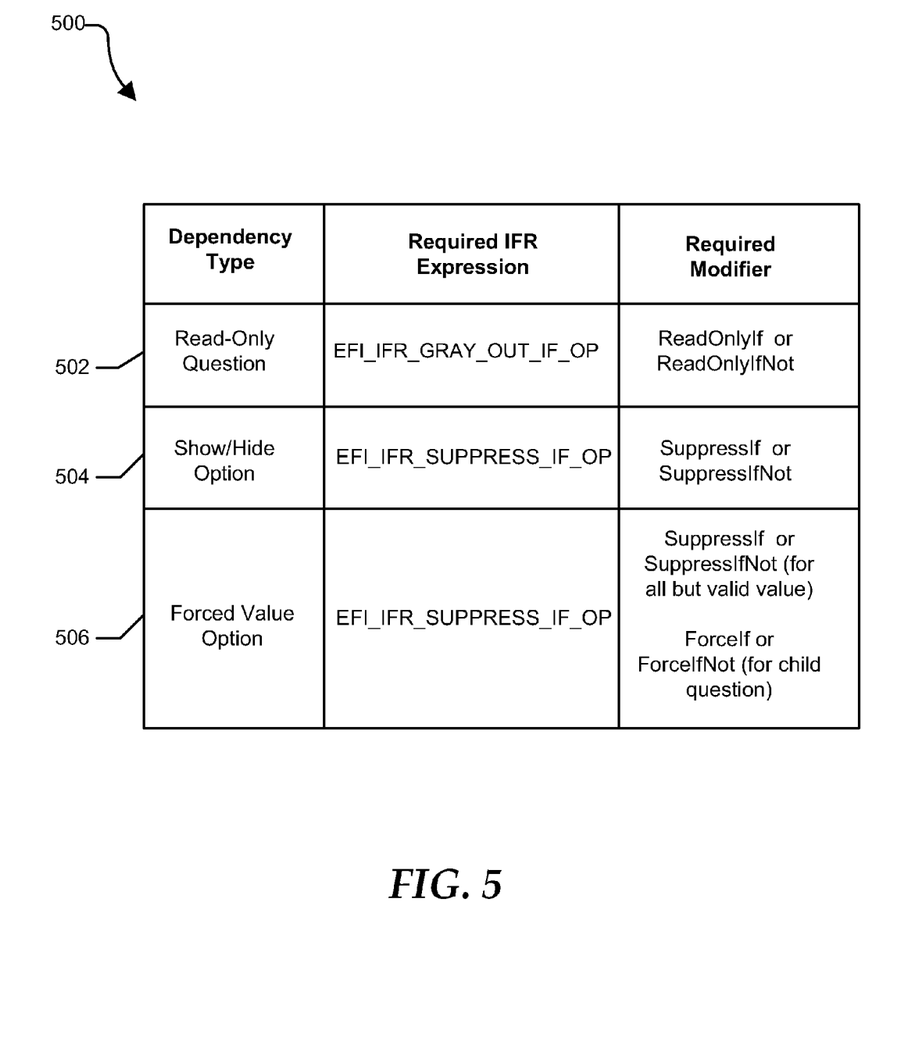
FIG. 5 is a table illustrating dependency modifiers that may be included at a string package of the HII database of FIG. 2 in accordance with a specific embodiment of the present disclosure.

FIG. 5 shows a table 500 illustrating dependency modifiers that may be included at the string package 204 of the HII database of FIG. 2. Dependency modifiers are a type of attribute modifier that can be used to describe a relationship between two or more configuration options associated with a single device at an information handling system. Dependency modifiers are particularly useful when configuration data, such as the contents of a UEFI HII database, is exported from an information handling system for evaluation and manipulation by a remote configuration management application program. In such a case, HII forms and strings information such as a compiled HII forms representation (IFR) expression stack, and software callbacks are not available. A configuration management application also may operate in an OS environment that does not have access to the IFR expression stack and to driver callbacks. In such cases, dependency modifiers, that are associated with objects such as questions prompts and option prompts, can be used to identify a relationship between configuration questions and associated devices and drivers present at an information handling system that is being managed. In particular, a dependency modifier can be used to identify when a particular configuration question is relevant or irrelevant based on the state of another configuration setting. A dependency modifier can be useful to support remote (offline) data processing, such as for describing child dependencies when the configuration associated with a parent question can change dynamically via user manipulation.

Table 500 includes examples how dependency modifiers can be used to mimic the behavior of a local UEFI forms processor or browser when presenting exported configuration data at an application external to the UEFI system. For example, while a UEFI compliant device driver may be aware of dependencies between configuration settings at a device, and render presentation of the configuration options appropriately, a remote application may be unaware of such interrelated configuration options. Table 500 includes examples of four situations wherein presentation of question or option fields is controlled based on the value of another configuration setting, including row 502 "Read-Only Question," row 504 "Show/Hide Option," and row 506 "Forced Value Option."

A read-only question is a question that is presented visibly to a user, such as via a forms browser, but the corresponding configuration settings can not be altered. For example, a prompt associated with a question may be displayed "grayed-out." A question can be configured to be read-only when the question becomes irrelevant due to the state of another configuration setting. For example, further configuration of a device is unnecessary if the device has been disabled by another configuration option. As used herein, the term child is used to describe a subordinate question, and the term parent is used to describe a controlling question on which the relevance of the child question depends. A device driver can use the UEFI HII protocol opcode, "EFI_IFR_GRAY_OUT_IF_OP" to configure a question to be read-only.

In order to make an external application aware that a particular object should be presented as read-only, a dependency modifier "ReadOnlyIf," or "ReadOnlyIfNot" can be appended to an HII configuration attribute within an HII string package. In this case, the HII configuration attribute is a UEFI configuration language question prompt string, which is a string corresponding to a configuration question, and referenced by a question prompt token string ID. The dependency modifier includes a value, which is a statement. The statement is an expression that associates an HII configuration attribute corresponding to a (parent) configuration question with another HII configuration attribute corresponding to one of the options associated with the parent question. An example of a UEFI configuration mapping string that includes a "ReadOnlyIf" dependency modifier is:

NicMode[ReadOnlyIf:NicEn=Disabled]

"NicMode" is a question prompt string corresponding to a child question. "ReadOnlyIf:NicEn=Disabled" is a dependency modifier, a type of attribute modifier, "NicEn" is a question prompt string corresponding to a parent question, and "Disabled" is one of the options provided by the parent question. In this example, the child question is displayed as grayed-out if the parent question is set to a value of disabled. In other words, the child question, to modify a mode of operation of a device, can be configured to be presented as read-only if the device has been disabled via the parent question.

A show/hide option is an option of a question that is made not-visible to a user, such as within a forms browser. A question also can be configured as show/hide. A device driver can us the UEFI HII protocol opcode, "EFI_IFR_SUPPRESS_IF_OP" to configure a question or option to be hidden. In order to make an external application aware that a particular option should be hidden, a dependency modifier "SuppressIf," or "SuppressIfNot" can be appended to an HII configuration attribute with an HII string package. An example of a UEFI configuration mapping string that includes a ReadOnlyIf dependency modifier is:

NiciScsi[SuppressIf:NicEn=Disabled]

The "SuppressIf" dependency modifier operates similar to the ReadOnlyIf dependency modifier except that the target, "NiciScsi" in this example, is hidden from view within a forms browser if the logical resolution of the expression "NicEn=Disabled" is true.

A forced value option can be used to select a particular option from amongst a choice of options at a question. A device driver can specify a UEFI HII protocol opcode, "EFI_IFR_SUPPRESS_IF_OP" to suppress (hide) one or more options associated with a child question since the options should no longer be modified by a user. In order to make an external application aware that a particular option should be forcibly selected, a dependency modifier "ForceIf," or "ForceIfNot" can be appended to an HII configuration attribute with an HII string package. An example of a UEFI configuration mapping string that includes a ForceIf dependency modifier is:

Disable[ForceIf:NicEn=Disabled]

The "ForceIf" dependency modifier above will result in the option "Disable" being selected when a parent question "NicEn" is configured to be "Disabled." The use of dependency modifiers is explained in detail below with reference to FIG. 6.

Figure 6:
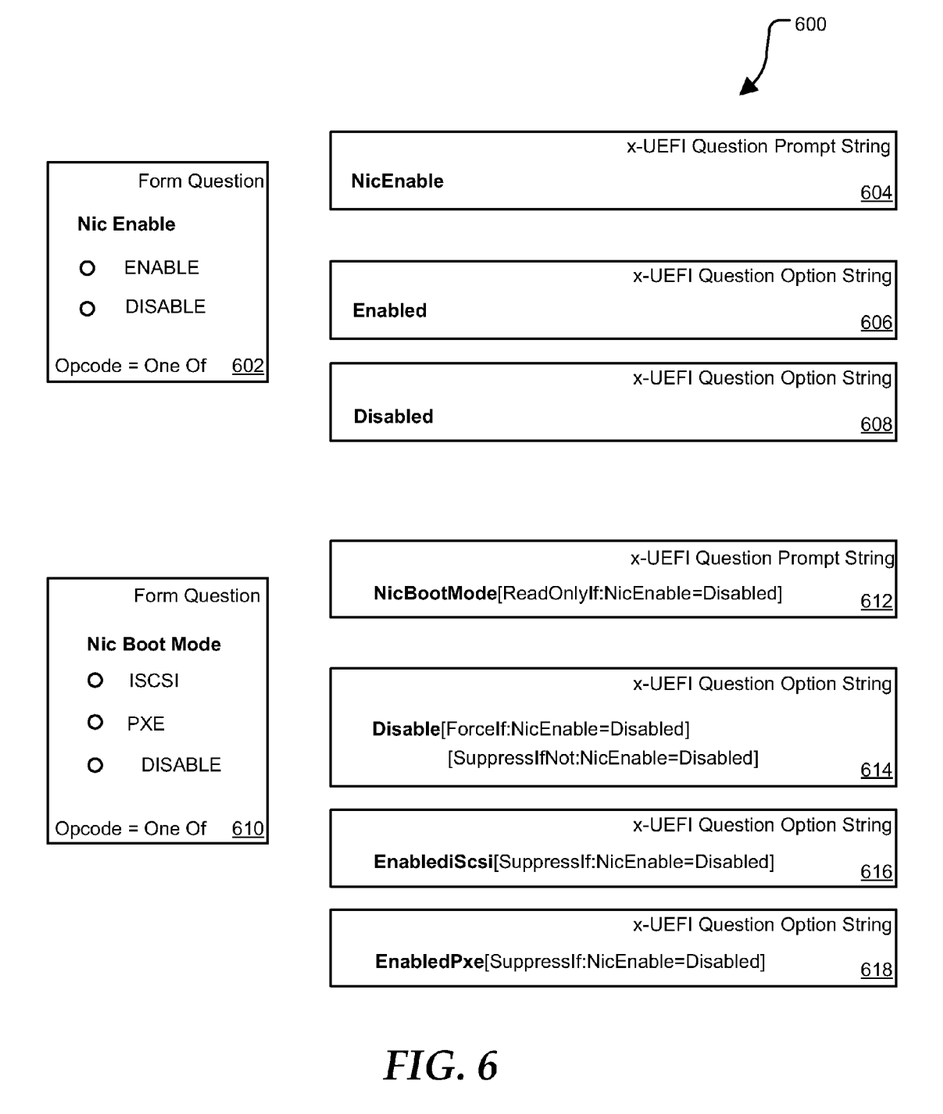
FIG. 6 is a block diagram illustrating examples of configuration information including dependency modifiers in accordance with a specific embodiment of the present disclosure.

FIG. 6 shows examples of configuration information 600 including dependency modifiers. The configuration information 600 includes a parent question 602, a corresponding question prompt string 604, and associated question option strings 606 and 608. The configuration information 600 also includes a child question 610, which depends on the question 602, a corresponding question prompt string 612, and question options strings 614, 616, and 618. The forms questions 602 and 610 can be included in an HII forms package, such as the HII forms package 202 at FIG. 2, and the strings 604-608 and 612-618 can be included in an HII strings package, such as the HII strings package 204 of FIG. 2.

The forms question 602 includes a UEFI HII forms (IFR) opcode "EFI_IFR_ONE_OF_OP," which is used to select one object from a set of objects. In particular, the forms question 602 provides a dialog for configuring whether a NIC device is enabled or disabled. Once again, the text illustrated at the forms question 602 may be contained in an English language string package. The prompt string 604, "NicEnable," represents a UEFI configuration language prompt string corresponding to the forms question 602, and shares a string ID value with the English language string "Nic Enable." Options strings 606 and 608 are UEFI configuration language strings corresponding to the two possible options associated with the forms question 602.

The forms question 610 includes a UEFI HII forms (IFR) opcode "EFI_IFR_ONE_OF_OP," which is used to select one object from a set of three objects. In particular, the forms question 610 provides a dialog for configuring whether a boot mode associated with a NIC device. In this example, this NIC device is the same device referenced by the forms question 602. Thus, forms question 610 depends on forms question 602. The prompt string 612, "NicBootMode," represents a UEFI configuration language prompt string corresponding to the forms question 610, and shares a string ID value with the English language string "Nic Boot Mode." The options strings 614, 616, and 618 represents UEFI configuration language option strings corresponding to the three options available at the forms question 610. The question prompt string 612 and the question options strings 614-618 each include one or more dependency modifiers to establish a relationship between the child question 610 and the parent question 602.

The question prompt string 612, "NicBootMode[ReadOnlyIf:NicEnable=Disabled]," includes an HII configuration attribute "NicBoodMode" that identifies the child question. The dependency modifier "ReadOnlyIf:NicEnable=Disabled" specifies that the forms question 610 should be configured to be read-only (such as grayed-out at a forms browser) when the NIC device is disabled by the parent question. For example, the expression "NicEnable=Disabled" includes an HII configuration attribute "NicEnable" that identifies the question prompt string 604 of the parent question 602, and the HII configuration attribute "Disabled" identifies the question option string 608. Accordingly, the ability to configure the boot mode of the NIC device is disabled when the NIC device has been disabled by the parent question.

The question option string 614, "Disabled[ForceIf:NicEnable=Disabled][SuppressIfNot:NicEnable=Disabled]," includes an HII configuration attribute "Disabled" that identifies the third (DISABLE) option of the child question 610, and further includes two dependency modifiers, each included within a pair of square brackets. The first dependency modifier "ForceIf:

NicEnable=Disabled" establishes that this particular option should be active if the value of the parent question "NicEnable" (604) is "Disabled" (608). The second dependency modifier "SuppressIfNot:NicEnable=Disabled" establishes that this option is should be configured to be suppressed (hidden) if the value of the parent question "NicEnable" (604) is "Disabled" (608).

The question option string 616, "EnablediScsi[SuppressIf: NicEnable=Disabled]," includes an HII configuration attribute "EnablediScsi" that identifies the first option of the child question 610 (ISCSI), and further includes a dependency modifier "SuppressIf:NicEnable=Disabled." This dependency modifier establishes that the "iScsi" option at the forms question 610 should be configured to be suppressed if the value of the parent question "NicEnable" (604) is "Disabled" (608). The question option string 618 is similar to the question option string 616, but establishes that the second option of the child question 610 (PXE) should be configured to be suppressed. Therefore, an application, such as a remote platform configuration application, can determine a relationship between the forms question 602 and the forms question 610 by analyzing the value of associated dependency modifiers, and configure the corresponding NIC device accordingly. The remote application can subsequently upload the modified configuration information to the information handling system.

Figure 7:
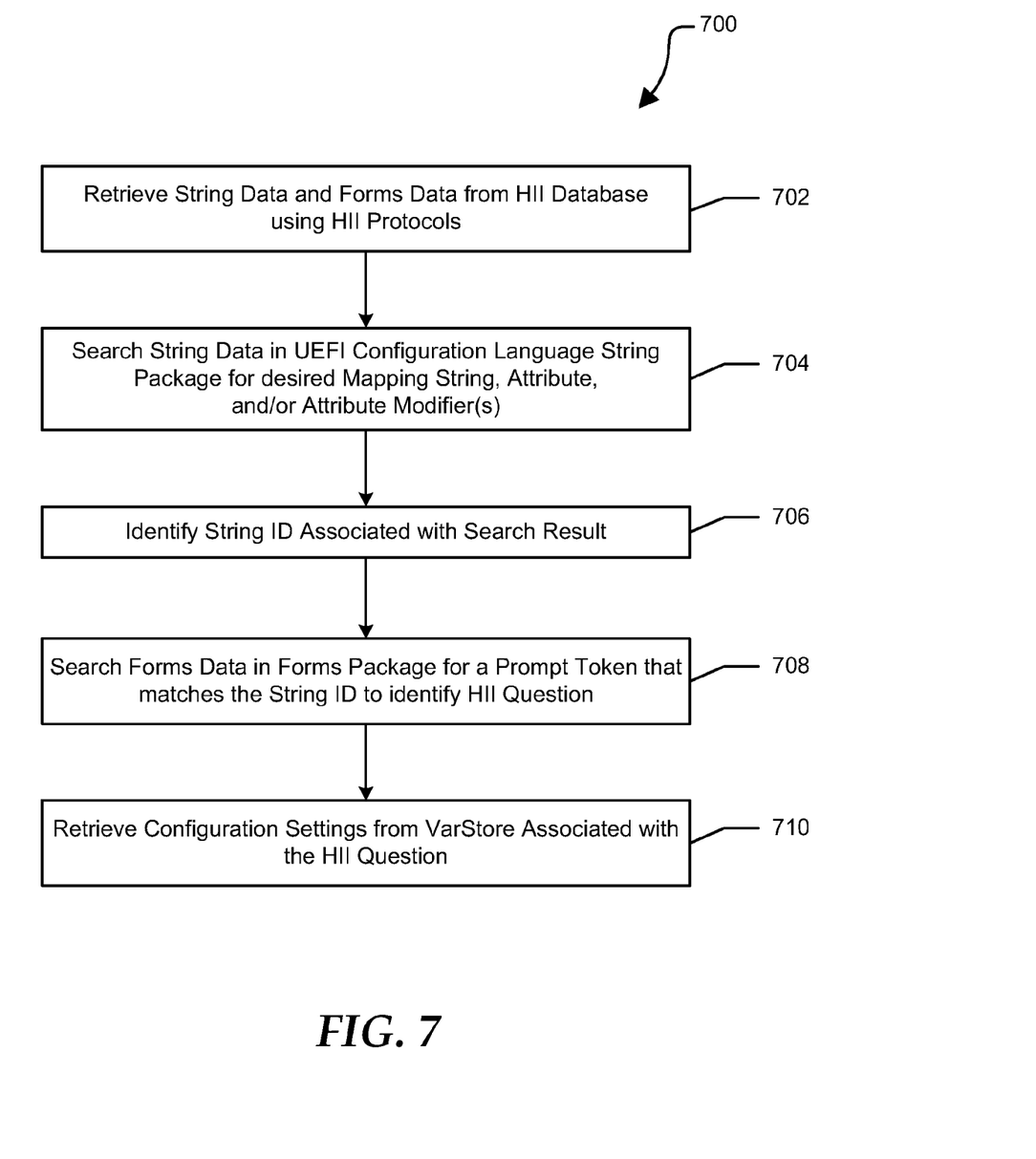
FIG. 7 is a flow diagram illustrating a method for determining configuration information associated with an information handling system, such as the information handling system of FIG. 1, in accordance with a specific embodiment of the present disclosure.

FIG. 7 shows a method 700 for determining configuration information associated with an information handling system, such as the information handling system 100 of FIG. 1. Method 700 demonstrates how an application, such as a local application or the UEFI BIOS, can use attribute modifiers to correlate devices and drivers at an information handling system with associated configuration options and settings. Method 700 begins at block 702 where string data and forms data is retrieved from an HII database using HII protocols. For example, an application can use routines included in the EFI_HII_DATABASE_PROTOCOLS to identify the forms packages and string packages published by the BIOS. The contents of desired package lists can be extracted from the HII database, such as the HII database 134 at FIG. 1, and stored at a memory buffer.

At block 704, the application can search string data included at the extracted UEFI configuration language string package to identify desired mapping strings, HII configuration attributes, and/or attribute modifiers. For example, an application can search the contents of a string package to locate all strings that include an attribute modifier specifying a fully qualified device descriptor of a particular device of interest. At block 706, a string ID associated with a mapping string identified at block 704 is identified. The string ID is a value that uniquely identifies the located string. At block 708, the application can search forms data included at the extracted forms packages for a prompt token that matches the string ID determined at block 706 to identify an HII question. Continuing with the example above, because the string ID determined at block 706 is associated with a string having an attribute modifier that specifies the fully qualified device descriptor of a particular device, any prompt token having the same value as the string ID corresponds to a configuration option associated with that device. At block 710, configuration settings associated with the HII question identified at block 708 can be retrieved from variable storage (VarStore) specified by data fields included within the forms data associated with the question. For example, the question associated with the identified prompt token may provide an interface for enabling and disabling the device.

One skilled in the art will appreciate that attribute modifiers, such as the attribute modifiers described above, can be associated with many types of HII configuration attributes to identify devices included at an information handling system, to identify the configuration of a device, to identify a relationship between two or more devices or configuration options, and the like. In particular, by complementing conventional HII information provided by a device manufacturer with selected attribute modifiers, an application program can refer to the supplied attribute modifiers to determine the configuration of an information handling system, and the configuration options available at the system, without a priori knowledge about the architecture or organization of the system.

Figure 8:
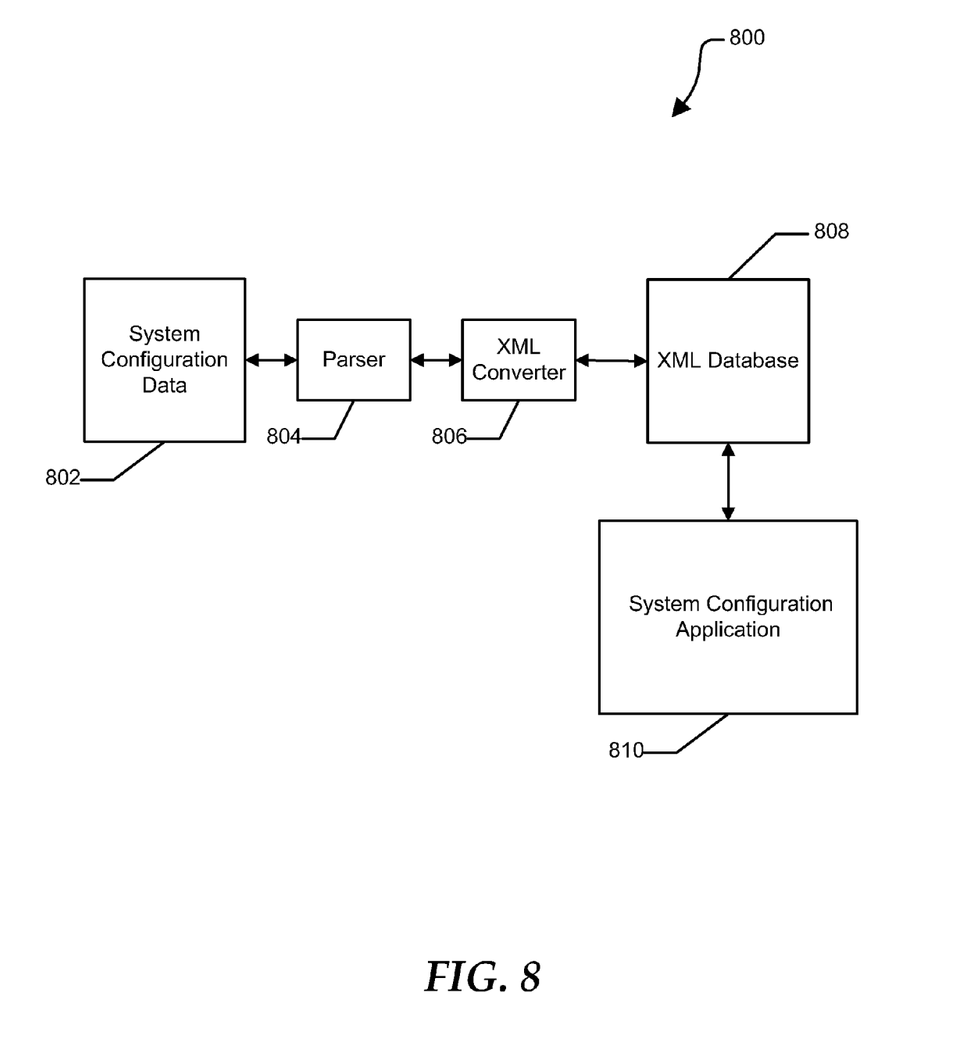
FIG. 8 is a block diagram illustrating a system for providing a configuration interface at an information handling system, such as the information handling system of FIG. 1 in accordance with a specific embodiment of the present disclosure.

FIG. 8 shows a system 800 for providing a configuration interface at an information handling system, such as the information handling system 100 of FIG. 1 in accordance with a specific embodiment of the present disclosure. System 800 includes system configuration data 802, a parser 804, an XML converter 806, an XML database 808, and a system configuration application 810. The system configuration data 802 can be maintained at a UEFI HII database or it may be included at another type of database that is configured to store configuration information associated with an information handling system. The system configuration data 802 may be stored local to the information handling system or it may be stored at an external device accessible to the information handling system. The system configuration data 802 can include not only configuration settings associated with an information handling system, but can also include forms data representing how the information is presented to a user, where the information is stored, string information, and the like. Furthermore, the system configuration data 802 can include attribute modifiers to provide a mapping between the system configuration data 802 and HII configuration attributes associated with an information handling system.

The parser 804 is configured to receive the system configuration data 802 and parse the information to provide an intermediate representation of the configuration information. For example, configuration data included at an HII database is stored in a data structure that can be inefficient to access. Moreover, information represented within an HII database can be stored at disparate locations, such as at multiple devices that make up the information handling system. The parser 804 can extract the system configuration data 802 from the HII database and parse the data to identify the various types of information included therein. In an embodiment, the parser 804 can be executed by the UEFI BIOS. The XML converter 806 receives the information from the parser 804 and converts the information into an XML format that can be queried or manipulated efficiently by a software application, such as the system configuration application 810. The system configuration application can be an application that is remote to the information handling system for which the configuration data is associated, or it can be an application executed locally by that information handling system. In an embodiment, the XML database 808 can be accessed while an associated information handling system is inaccessible.

The XML database 808 is a configuration database, which can include configuration information associated with a single information handling system, or may include configuration information associated with multiple systems. In an embodiment, the XML database may be included at a service processor, such as the service processor 132 at FIG. 1. The XML database 808 may include a subset of the system configuration data 802, or it may include the system configuration data 802 in its entirety. In addition, the XML database 808 can include information representative of attribute modifiers included at the system configuration data 802. The system configuration application 810 can utilize the attribute modifiers to determine a relationship between configuration settings, configuration options, hardware devices, software drivers, and other HII configuration attributes. The system configuration data 802 and attribute modifiers included therein should conform to established rules of syntax to allow the parser 804 to extract selected system configuration data in a deterministic and unambiguous manner. For example, attribute modifiers can be included within a matching pair of square brackets, but the modifier should not include additional square brackets within the modifier string. Other syntax rules can be instituted and observed, as necessary, to avoid ambiguity and to support efficient parsing.

Referring back to FIG. 1, the information handling system 100 can include a set of instructions that can be executed to cause the computer system to perform any one or more of the methods or computer based functions disclosed herein. The computer system 600 may operate as a standalone device or may be connected such as using a network, to other computer systems or peripheral devices.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The disk drive unit 116 may include a computer-readable medium 122 in which one or more sets of instructions 124 such as software, can be embedded. Further, the instructions 124 may embody one or more of the methods or logic as described herein. In a particular embodiment, the instructions 124 may reside completely, or at least partially, within the main memory 104, the static memory 106, and/or within the processor 102 during execution by the information handling system 100. The main memory 104 and the processor 102 also may include computer-readable media. The network interface device 120 can provide connectivity to a network 126, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 124 or receives and executes instructions 124 responsive to a propagated signal, so that a device connected to a network 126 can communicate voice, video or data over the network 126. Further, the instructions 124 may be transmitted or received over the network 126 via the network interface device 120.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:
1. A computer implemented method comprising:
  determining a first portion of a Unified Extensible Firmware Interface (UEFI) configuration language string, the first portion identifying a Human Interface Infrastructure (HII) configuration attribute;

determining a second portion of the string including a first attribute modifier, the first attribute modifier including a first name-value pair identifying a first name and a first value, wherein the first name and the first value are individually parsable, and wherein the meaning of the first value is determined based on the first name; and storing the string at an HII string package of an HII database, wherein the string is uniquely referenced by an HII string identifier, and wherein storing the string comprises storing the string at a memory device.

2. The method of claim 1 wherein the first value is to specify a fully qualified device descriptor associated with the HII configuration attribute.

3. The method of claim 1 wherein the first value is to specify a boot-path to identify a location of a UEFI boot-file at a device.

4. The method of claim 1 wherein the first value is to specify boot-data, the boot-data including a Unicode representation of hexadecimal data to be passed to an operating system loader.

5. The method of claim 1 wherein the first value is to specify a boot-type indicating a boot method for a device associated with the HII configuration attribute.

6. The method of claim 1 wherein the first value is to specify a partition of a logical network associated with the HII configuration attribute.

7. The method of claim 1 wherein the first value is to specify a port number identifying a port associated with the HII configuration attribute.

8. The method of claim 1 wherein the UEFI configuration language string corresponds to an HII question prompt token, the HII question prompt token associated with a configurable object included at an information handling system.

9. The method of claim 1 wherein the UEFI configuration language string corresponds to an option provided by an HII question, the HII question associated with a configurable object included at an information handling system.

10. The method of claim 1 wherein the first attribute modifier is to provide a unique map of HII configuration data to one of a plurality of HII configuration attributes at an information handling system.

11. The method of claim 1 wherein parsable comprises encoding the string using a predetermined syntax to permit individual identification of the first name and of the first value of the first name-value pair.

12. The method of claim 1 wherein the second portion of the string includes a second attribute modifier, the second attribute modifier including a second name-value pair.

13. A computer implemented method comprising:
retrieving a UEFI configuration language string from a Human Interface Infrastructure (HII) string package of an HII database, the HII database stored at a memory device; and
parsing the string to determine:
a first portion identifying an HII configuration attribute; and
a second portion identifying a first attribute modifier including a first name-value pair, wherein a first name and a first value of the first name-value pair are individually parsable, and wherein the meaning of the first value is determined based on the first name.

14. The method of claim 13 wherein the first value is to specify a parameter selected from a group consisting of a fully qualified device descriptor, a boot-path to identify a file path to a UEFI boot-file at a device, boot-data including a Unicode representation of hexadecimal data to be passed to an operating system loader, a boot-type to indicate a boot method for a device, a partition identifier to represent a logical network included at a port to which the HII configuration attribute applies, and a port number associated with a port.

15. The method of claim 13 further comprising:
altering the first attribute modifier to provide an updated UEFI configuration language string; and
storing the updated string at the HII string package.

16. The method of claim 13 wherein the UEFI configuration language string corresponds to an HII question prompt token, the HII question prompt token associated with a configurable object included at an information handling system.

17. The method of claim 13 wherein the UEFI configuration language string corresponds to an option provided by an HII question, the HII question associated with a configurable object included at an information handling system.

18. An information handling system comprising:
a processor; and
a storage medium, the storage medium comprising instructions executable by the processor to:
determine a first portion of a Unified Extensible Firmware Interface (UEFI) configuration language string, the first portion identifying a Human Interface Infrastructure (HII) configuration attribute; and
determine a second portion of the string including a first attribute modifier, the first attribute modifier including a first name-value pair including a first name and a first value, wherein the first name and the first value are individually parsable, and wherein the meaning of the first value is determined based on the first name;
store the string at an HII string package of an HII database, wherein the string is uniquely referenced by an HII string identifier, and wherein storing the string comprises storing the string at a memory device.

19. The information handling system of claim 18 wherein the first value is to specify a parameter selected from a group consisting of a fully qualified device descriptor, a boot-path to identify a file path to a UEFI boot-file at a device, boot-data including a Unicode representation of hexadecimal data to be passed to an operating system loader, a boot-type to indicate a boot method for a device, a partition identifier to represent a logical network included at a port to which the HII configuration attribute applies, and a port number associated with a port.

20. The information handling system of claim 18 wherein the UEFI configuration language string corresponds to an HII question prompt token, the HII question prompt token associated with a configurable object included at an information handling system.

* * * * *